US010586051B2

(12) United States Patent
Hatsutori et al.

(10) Patent No.: US 10,586,051 B2
(45) Date of Patent: *Mar. 10, 2020

(54) AUTOMATIC TRANSFORMATION OF SECURITY EVENT DETECTION RULES

(71) Applicant: International Business Machines Corporation, Armonk, NY (US)

(72) Inventors: Yoichi Hatsutori, Minato-ku (JP); Takuya Mishina, Sagamihara (JP); Naoto Sato, Kawasaki (JP); Fumiko Satoh, Itabashi-ku (JP)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/692,429

(22) Filed: Aug. 31, 2017

(65) Prior Publication Data

US 2019/0065755 A1 Feb. 28, 2019

(51) Int. Cl.
*G06F 21/00* (2013.01)
*G06F 21/57* (2013.01)
(Continued)

(52) U.S. Cl.
CPC ............ *G06F 21/577* (2013.01); *G06F 21/10* (2013.01); *G06F 21/554* (2013.01); *H04L 63/14* (2013.01);
(Continued)

(58) Field of Classification Search
CPC ...... G06F 21/10; G06F 21/554; G06F 21/577; H04L 63/1416; H04L 63/1425; H04L 63/14
(Continued)

(56) References Cited

U.S. PATENT DOCUMENTS 9,064,210 B1 * 6/2015 Hart ....................... G06N 7/005
9,306,962 B1 4/2016 Pinto
(Continued)

OTHER PUBLICATIONS

Nazir, Anam, et al. "A high-level domain-specific language for SIEM (design, development and formal verification)." Cluster Computing 20.3 (2017): 2423-2437. (Year: 2017).*

(Continued)

*Primary Examiner* — Syed A Zaidi
(74) *Attorney, Agent, or Firm* — Edward P. Li

(57) ABSTRACT

A computer-implemented method, a computer program product, and a computer system for transformation of security information and event management (SIEM) rules and deploying the SIEM rules in a network of event processors. A computer system or server converts the SIEM rules to formal representations. The computer system or server generates rule abstraction of the formal representations, by using an abstraction function. The computer system or server constructs a finite automaton based on the rule abstraction. The computer system or server eliminates irrelevant transitions in the finite automaton to generate an optimized finite automaton. The computer system or server generates optimized formal rules, based on the optimized finite automaton. The computer system or server converts the optimized formal rules to optimized SIEM rules. The computer or server deploys the optimized SIEM rules in the network of the event processors.

18 Claims, 13 Drawing Sheets

(51) Int. Cl.
*G06F 21/10* (2013.01)
*H04L 29/06* (2006.01)
*G06F 21/55* (2013.01)

(52) U.S. Cl.
CPC ...... *H04L 63/1416* (2013.01); *H04L 63/1425* (2013.01)

(58) Field of Classification Search
USPC .......................................................... 726/3
See application file for complete search history.

(56) References Cited

U.S. PATENT DOCUMENTS

| | | | |
|---|---|---|---|
| 9,516,053 B1 | 12/2016 | Muddu et al. | |
| 9,560,068 B2 | 1/2017 | Figlin | |
| 9,634,951 B1* | 4/2017 | Hunt ...................... | H04L 47/50 |
| 10,049,220 B1 | 8/2018 | Hatsutori | |
| 2003/0220940 A1 | 11/2003 | Futoransky | |
| 2004/0172234 A1* | 9/2004 | Dapp ...................... | G06F 8/427 |
| | | | 704/1 |
| 2005/0251860 A1* | 11/2005 | Saurabh ................. | G06F 21/552 |
| | | | 726/23 |
| 2005/0289354 A1* | 12/2005 | Borthakur ........... | G06F 21/6227 |
| | | | 713/182 |
| 2006/0089952 A1 | 4/2006 | Pandit | |
| 2008/0010225 A1* | 1/2008 | Gonsalves ............. | G06N 7/005 |
| | | | 706/11 |
| 2009/0019092 A1* | 1/2009 | Dettinger ............ | G06F 21/6227 |
| 2011/0288692 A1* | 11/2011 | Scott ...................... | G06F 21/55 |
| | | | 700/297 |
| 2012/0254313 A1* | 10/2012 | Fake .................. | G06F 11/3068 |
| | | | 709/204 |
| 2013/0117847 A1* | 5/2013 | Friedman .............. | H04L 63/102 |
| | | | 726/22 |
| 2013/0246996 A1* | 9/2013 | Duggal .................... | G06F 8/35 |
| | | | 717/104 |
| 2013/0312101 A1* | 11/2013 | Lotem ..................... | G06F 21/55 |
| | | | 726/25 |
| 2014/0040261 A1 | 2/2014 | Home et al. | |
| 2014/0059641 A1* | 2/2014 | Chapman, II ......... | G06F 21/554 |
| | | | 726/1 |
| 2014/0223555 A1* | 8/2014 | Sanz ....................... | G06F 21/55 |
| | | | 726/22 |
| 2014/0244650 A1 | 8/2014 | Zhou et al. | |
| 2014/0372105 A1 | 12/2014 | Manadhata et al. | |
| 2015/0113646 A1 | 4/2015 | Lee et al. | |
| 2015/0222666 A1* | 8/2015 | Kumar .................... | G06F 21/53 |
| | | | 726/1 |
| 2015/0222667 A1 | 8/2015 | Nayshtut et al. | |
| 2015/0229661 A1 | 8/2015 | Balabine et al. | |
| 2015/0269383 A1* | 9/2015 | Lang ....................... | G06F 21/57 |
| | | | 726/1 |
| 2015/0341379 A1 | 11/2015 | Lefebvre et al. | |
| 2015/0365438 A1* | 12/2015 | Carver ................ | H04L 63/1441 |
| | | | 726/1 |
| 2016/0191549 A1* | 6/2016 | Nguyen ................. | G06F 11/00 |
| | | | 726/23 |
| 2016/0212167 A1* | 7/2016 | Dotan .................... | H04L 63/20 |

OTHER PUBLICATIONS

Appendix P List of IBM Applications or Patents Treated as Related. Dated Dec. 28, 2017. Two pages.

Hatsutori et al. Original U.S. Appl. No. 15/840,587, filed Dec. 13, 2017.

Aman et al. "Event Driven Adaptive Security in Internet of Things" BICOMM 2014 : The Eighth International Conference on Mobile Ubiquitous Computing, Systems, Services and Technologies. pp. 7-16.

Coppolino et al. (2013) "Enhancing SIEM Technology to Protect Critical Infrastructures." In: Hammerli B.M., Kalstad Svendsen N., Lopez J. (eds) Critical Information Infrastructures Security. CRITIS 2012. Lecture Notes in Computer Science, vol. 7722. Springer, Berlin Heidelberg.

Kolios et al. "Data-Driven Event Triggering for IoT Applications" IEEE Internet of Things Journal, vol. 3, No. 6, Dec. 2016. pp. 1146-1158.

* cited by examiner

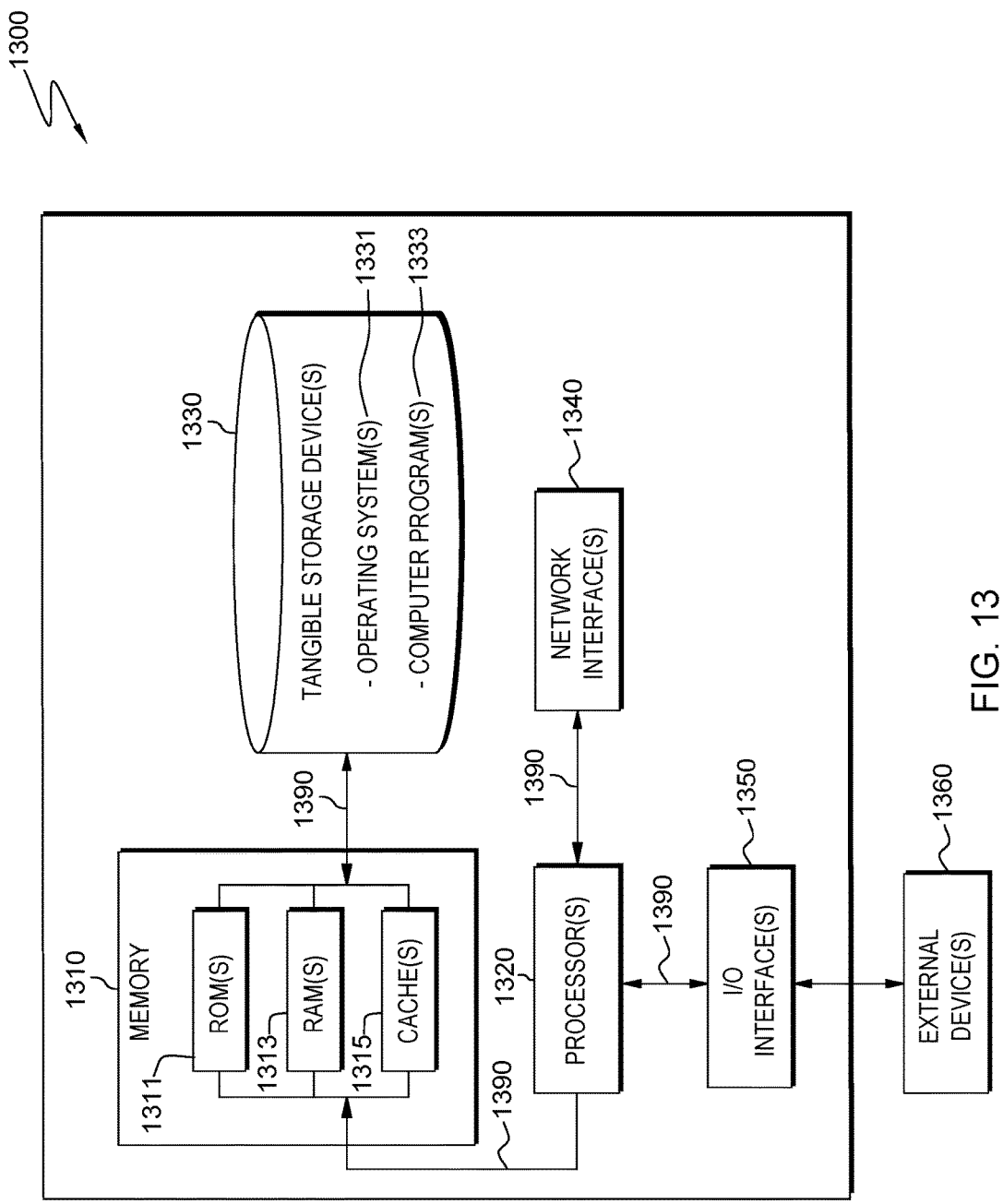

AUTOMATIC TRANSFORMATION OF SECURITY EVENT DETECTION RULES

BACKGROUND

The present invention relates generally to network security, and more particularly to automatic transformation of security event detection rules.

SIEM (Security Information and Event Management) events are processed by event processors (EPs) distributed across a network. Each of the event processors (EPs) is directly connected to one or more event sources (ESs) which raise events to the each of the event processors (EPs). Each of the event processors (EPs) carries a set of rules. When events from locally connected event sources (ESs) are processed, the set of rules are applied. When a security violation is detected, the event processor (EP) raises a security alert.

In distributed SIEM (Security Information and Event Management), when an event processor (EP) applies the rules, event processors (EPs) may need to be aware of events raised at remotes event processors (EPs). In this case, the EPs have to properly communicate with each other to share event information. If every event information is shared among the EPs, it often leads to poor performance due to substantial network traffic and redundant event processing on the EPs. This is the most challenging part of distributed SIEM (Security Information and Event Management).

SUMMARY

In one aspect, a computer-implemented method for transformation of security information and event management (SIEM) rules and deploying the SIEM rules in a network of event processors is provided. The method is implemented by a computer system or a server. The computer-implemented method comprises converting the SIEM rules to formal representations; generating rule abstraction of the formal representations, by using an abstraction function; constructing a finite automaton based on the rule abstraction; eliminating irrelevant transitions in the finite automaton to generate an optimized finite automaton; generating optimized formal rules, based on the optimized finite automaton; converting the optimized formal rules to optimized SIEM rules; and deploying the optimized SIEM rules in a network of event processors.

In another aspect, a computer program product for transformation of security information and event management (SIEM) rules and deploying the SIEM rules in a network of event processors is provided. The computer program product comprises a computer readable storage medium having program code embodied therewith. The program code is executable to convert the SIEM rules to formal representations. The program code is further executable to generate rule abstraction of the formal representations, by using an abstraction function. The program code is further executable to construct a finite automaton based on the rule abstraction. The program code is further executable to eliminate irrelevant transitions in the finite automaton to generate an optimized finite automaton. The program code is further executable to generate optimized formal rules, based on the optimized finite automaton. The program code is further executable to convert the optimized formal rules to optimized SIEM rules. The program code is further executable to deploy the optimized SIEM rules in a network of event processors.

In yet another aspect, a computer system for transformation of security information and event management (SIEM) rules and deploying the SIEM rules in a network of event processors is provided. The computer system comprises one or more processors, one or more computer readable tangible storage devices, and program instructions stored on at least one of the one or more computer readable tangible storage devices for execution by at least one of the one or more processors. The program instructions are executable to: convert the SIEM rules to formal representations; generate rule abstraction of the formal representations, by using an abstraction function; construct a finite automaton based on the rule abstraction; eliminate irrelevant transitions in the finite automaton to generate an optimized finite automaton; generate optimized formal rules, based on the optimized finite automaton; convert the optimized formal rules to optimized SIEM rules; and deploy the optimized SIEM rules in a network of event processors.

BRIEF DESCRIPTION OF THE SEVERAL VIEWS OF THE DRAWINGS

FIG. 13 is a diagram illustrating components of a computer device for automatic transformation of security event detection rules and deploying the rules in a network of event processors or a computer device hosting one or more event processors and/or Security Information and Event Management (SIEM) rules, in accordance with one embodiment of the present invention.

DETAILED DESCRIPTION

In embodiments of the present invention, rules for processing event sources (ESs) should be defined without considering distribution of event processors (EPs) but just by assuming a single EP. Events raised to an EP are shared by remote EPs only when it is necessary for the event processing on the remote EPs so that network traffic is minimized and event processing redundancy is eliminated.

Figure 1:
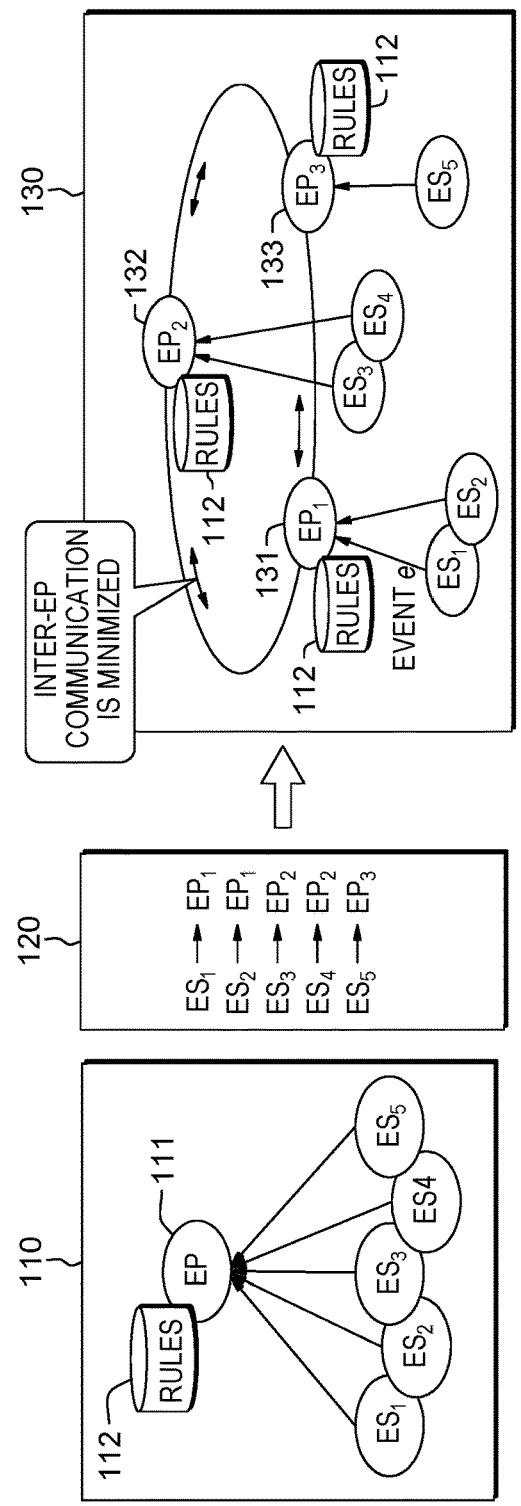
FIG. 1 is a diagram showing a set of rules defined by assuming a single event processor and the set of rules copied/shared by a plurality of event processors, in accordance with one embodiment of the present invention.

FIG. 1 is a diagram showing a set of rules defined by assuming single event processor 111 and the set of rules copied/shared by a plurality of event processors (131, 132, and 133), in accordance with one embodiment of the present invention. As shown in 110, a set of rules (denoted by numeral 112) are defined by assuming a single EP (denoted by numeral 111). Block 120 and block 130 show correspondence from each ES to a particular EP; therefore, when an event e is raised by an ES, the system can detect which EP directly receives/processes the event e. Shown in block 120 and block 130, event source 1 (ES1) corresponds to event processor 1 (EP1 131), event source 2 (ES2) also corresponds to event processor 1 (EP1 131), event source 3 (ES3) corresponds to event processor 2 (EP2 132), event source 4 (ES4) also corresponds to event processor 2 (EP2 132), and event source 5 (ES5) corresponds to event processor 3 (EP3 133). EP1 131 directly receives/processes the event e which is from ES1.

FIG. 1 further shows the set of rules (denoted by numeral 112) are copied or shared by event processor 1 (EP1 131), event processor 2 (EP1 132), and event processor 3 (EP1 133). The set of rules (denoted by numeral 112) are defined to minimize inter-EPs communication.

Figure 2:
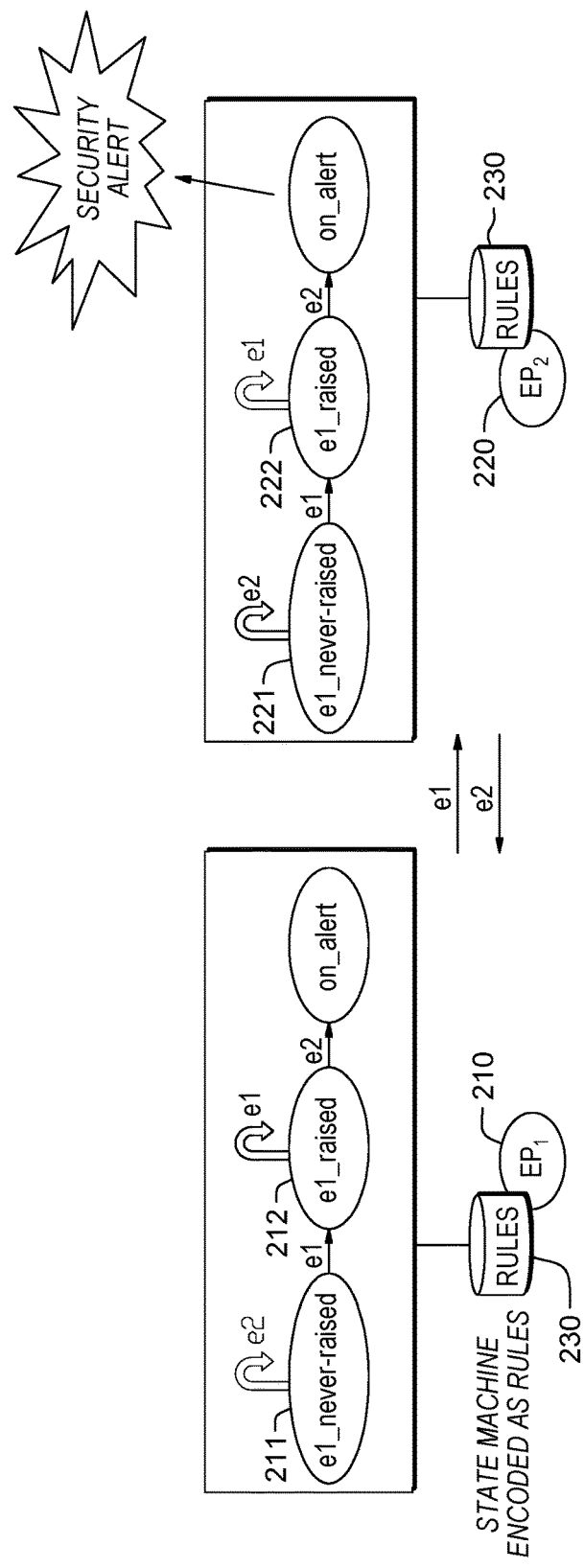
FIG. 2 is a diagram showing state machine abstraction of rules, in accordance with one embodiment of the present invention.

FIG. 2 is a diagram showing state machine abstraction of rules, in accordance with one embodiment of the present invention. The rules are abstracted to a finite state machine that has the following characteristics. (1) Each of event processors (such as EP1 131, EP1 132, and EP1 133 shown in FIG. 1) carries a copy of the finite state machine which keeps tracking events processed on the each of the event processors. (2) Each state represents what really needs to be observed across event processors. (3) Each event incurs a state transition on the finite state machine.

When the state transition actually changes the state, the event (for example the event e shown in FIG. 1) is passed to one or more remote event processors. Therefore, all the event processors (such as EP1 131, EP2 132, and EP3 133 shown in FIG. 1) share the same state which has been changed. When the state transition does not change the state, the event is just consumed by the local EP (such as EP1 131 shown in FIG. 1) and is not passed to remote EPs (such as EP2 132 and EP3 133 shown in FIG. 1). By defining a finite state machine properly, the inter-EP communication (shown in FIG. 1) can be reduced so that events are passed across EPs only when necessary.

FIG. 2 shows an example of state machine abstraction of rules. The finite state machine is encoded as rules (230). The initial states of EP1 (210) and EP2 (220) are "e1_never_raised" (211 and 221). If the state of EP1 (210) is "e1_never_raised" (211), when EP1 (210) receives the event e1, EP1 (210) changes the state to "e1_raised" (212) and notifies EP2 (220) of the change of the finite state machine. Upon receiving the notification from EP1 (210), EP2 (220) synchronizes its state to "e1_raised" (222), so that both EP1 (210) and EP2 (220) point to "e1_raised" (212 and 222) as their current states. If the state of EP1 (210) is "e1_raised" (212), when EP1 (210) receives the event e1, EP1 (210) consumes the event e1 just locally.

If the state of EP2 (220) is "e1_never_raised" (221), when EP1 (210) receives the event e2, EP2 (220) consumes the event e2 just locally. If the state of EP2 (220) is "e1_raised" (222), when EP2 (220) receives the event e2, EP2 (220) changes its state from "e1_raised" (222) to "on alert" (223) and notifies EP1 (210) of the change of the finite state machine. Further, as soon as the state is changes, EP2 (220) raises a security alert.

Figure 3:
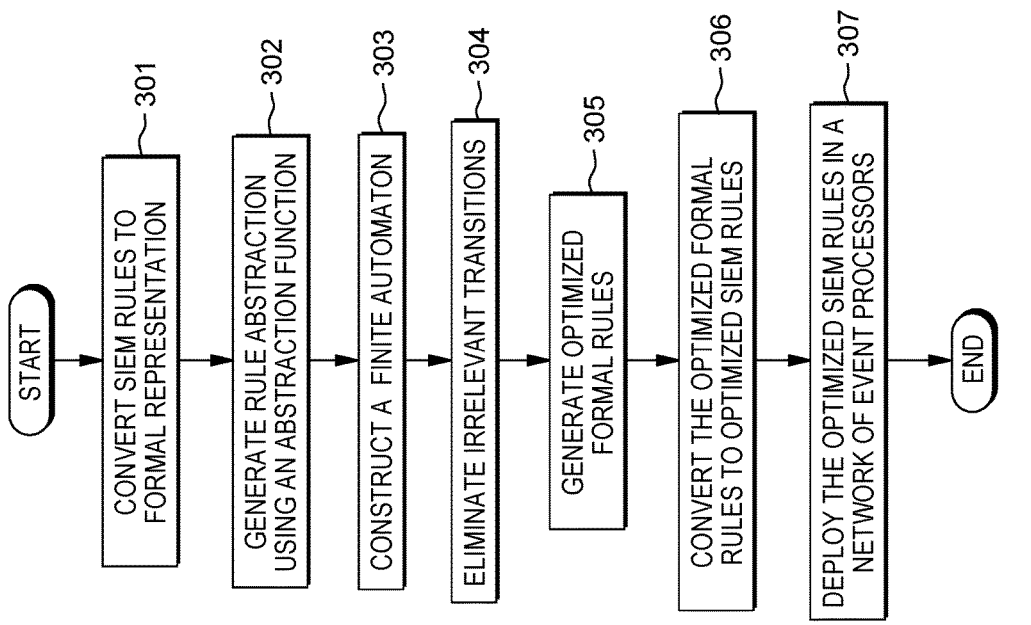
FIG. 3 is a diagram showing steps of transformation of SIEM (Security Information and Event Management) rules and deploying the rules in a network of event processors, in accordance with one embodiment of the present invention.

FIG. 3 is a diagram showing steps of transformation of SIEM (Security Information and Event Management) rules and deploying the rules in a network of event processors, in accordance with one embodiment of the present invention. In one embodiment, the transformation of the SIEM (Security Information and Event Management) rules is implemented by a computer system or server, and then the rules are deployed in the network of the event processors shown in FIG. 1. At step 301, the computer system or server converts the SIEM (Security Information and Event Management) rules to formal representations. At this step, the input is the SIEM rules and the output is the formal rules. Through this step, the SIEM rules are represented by logical formulas and transformed into a system of equations. The logical formulas and the system of equations will be discussed in detail with reference to use cases in latter paragraphs of this document. For the first use case described in later paragraphs, the output of step 301 is as $$ldap(t, \text{printer}, \ldots) \rightarrow \text{offence when}$$
$$\exists t' < t . fw(t', \text{host}, \ldots) \in \text{past\_event}$$

At step 302, the computer system or server generates rule abstraction of formal rules using an abstraction function. At this step, the inputs are the formal rules and the abstraction function $\alpha$, and the output is abstracted rules. Abstraction of the formal rules using the abstraction function $\alpha$ simplifies the rules with no negative impact on the soundness of the rules. It is assumed that the abstraction function $\alpha$ is provided as a part of inputs to this step. For instance, the abstraction function $\alpha$ employed does conversion of events to alphabets, along with conditions to regular-expression matches. The input of the abstraction function $\alpha$ is as $$\text{name}(\_, \text{host}, \_) \xrightarrow{\alpha} \text{a unique alphabet}$$

$$\text{condition} \xrightarrow{\alpha} \text{regular expression match.}$$

The output of the abstraction is as $$b \rightarrow \text{offence when abstracted\_past\_event} \sim /.*a.*/$$

For the first use case described in later paragraphs, $$fw(\_, \text{printer}, \_) \xrightarrow{\alpha} \text{`a'}$$

$$ldap(\_, \text{printer}, \_) \xrightarrow{\alpha} \text{`b'}$$

and $$\exists t' < t . fw(t', \text{printer}, \ldots) \in \text{past\_event} \xrightarrow{\alpha} \text{abstracted\_past\_event} \sim /.*a.*/$$

At step 303, the computer system or server constructs a finite automaton. At this step, the input is the abstracted rules and the output is a single finite automaton (FA). The abstract rules are transformed into a state transition system (finite-state automaton). Rule processing using this FA has the following properties. (1) Soundness: If no offence is raised on the FA, it is guaranteed that rule processing with the original rules raise no offence. (2) Further simplification: If a transition does not change states, the transition (and the corresponding rule) can be safely eliminated without affecting the semantics of the rules. The mathematical expressions of the finite automaton are as follows.

$$states=\{q_1,q_2,\text{offensive\_raised}\}$$

where q1 and q2 respectively correspond with /.*a.*/ and complement (/.*a.*/)=/[^a]*/. Since an empty string (' ') does not match /.*a.*/, initial states=q2

$$transitions=\{t1,t2,t3,t4\}$$

where t1: $q1 \overset{b}{\rightarrow}$ offence_raise(∵ rule)

t2: $q2 \overset{b}{\rightarrow} q2$(∵ append(/[^a]*/,'b')∩/.*a.*/=∅ t3: $q1 \overset{a}{\rightarrow} q1$(∵ append(/.*a.*/,'a')∩/.*a.*/≠∅ t4: $q2 \overset{a}{\rightarrow} q1$(∵ append(/[^a]*/,'a')∩/.*a.*/≠∅

At step 304, the computer system or server eliminates irrelevant transitions. At this step, the input is the single finite automaton and the output is an optimized finite automaton. The mathematical expressions of elimination of irrelevant transitions are as follows.

$$transitions=\{t1,t4\}$$

t2 and t3 have been removed since (1) each of them remains in the same state and (2) they have no corresponding rules.

At step 305, the computer system or server generates optimized formal rules. At step 305, the inputs are the optimized finite automaton generated at step 304 and the formal rules generated at step 301. Another input is the mapping function m:

rule $\overset{m}{\rightarrow}$ event processor

The outputs of step 305 are optimized formal rules. For the first use case described in later paragraphs, an optimized version of the original formal rule for t1 is ldap(t,printer, . . . )→offence when state=$q_1$ and a newly generated optimized version of the original formal rule for t4 and mapped to m(fw(t, printer, . . . )→ . . . ) is fw(t,printer, . . . )→state: =$q_1$ when state=$q_2$ where m(fw(t, host, . . . )→ . . . )=the nearest event processor from the host.

At step 306, the computer system or server converts the optimized formal rules to optimized SIEM (Security Information and Event Management) rules. At this step, the input is the optimized formal rules and the output is the optimized STEM (Security Information and Event Management) rules.

At step 307, the computer system or server deploys the optimized STEM (Security Information and Event Management) rules in a network of event processors. The optimized SIEM rules are distributed over in a network of event processors and copied/shared by a plurality of event processors. For example, the computer system or server deploys the optimized SIEM (Security Information and Event Management) rules in event processor 1 (EP1 131), event processor 2 (EP1 132), and event processor 3 (EP1 133) in the network shown in FIG. 1.

Figure 4:
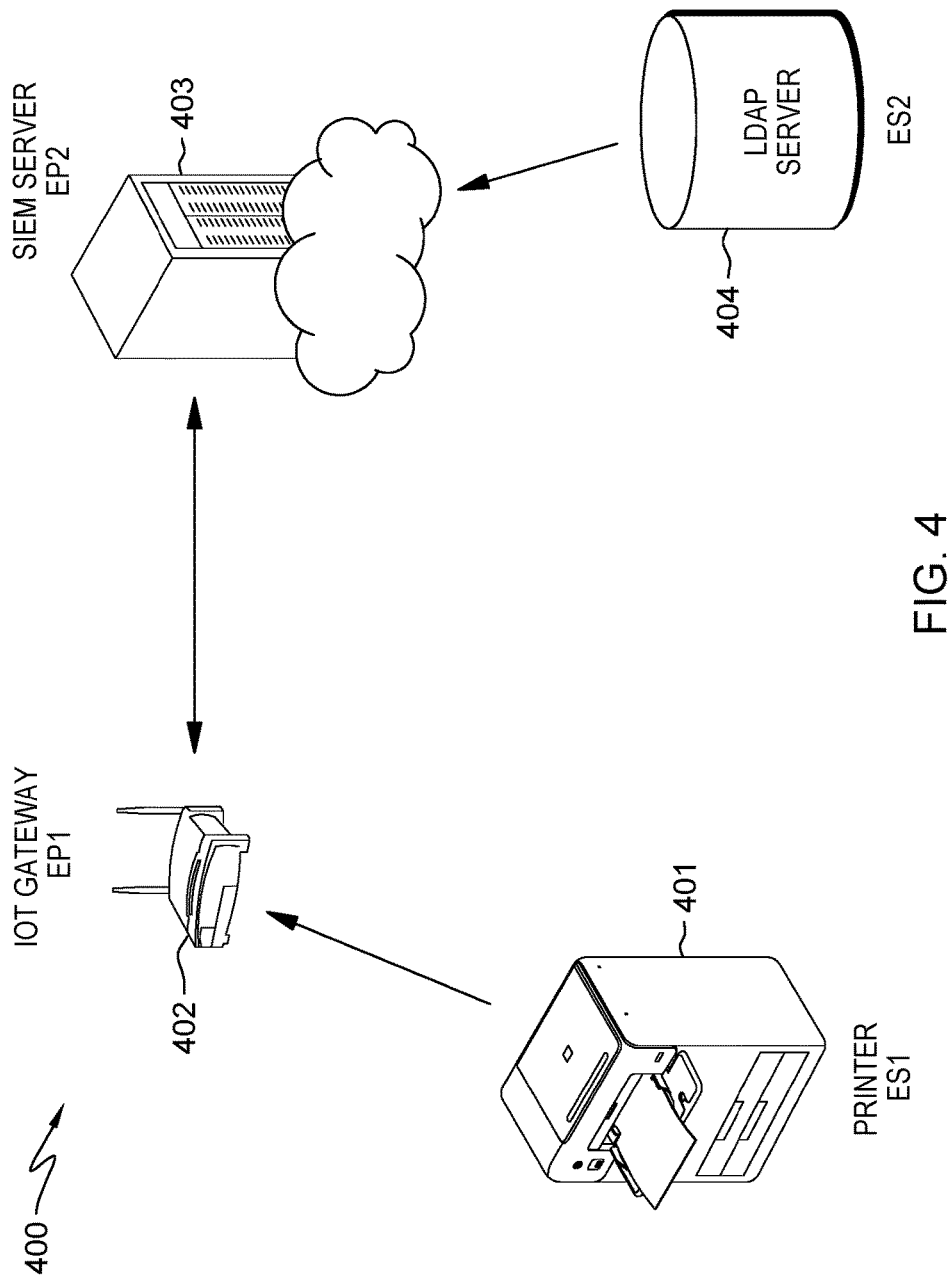
FIG. 4 is a diagram showing a system in a first use case, in accordance with one embodiment of the present invention.

FIG. 4 is a diagram showing system 400 in a first use case, in accordance with one embodiment of the present invention. System 400 includes network printer 401, IoT (Internet of Things) gateway 402, SIEM (Security Information and Event Management) server 403, and LDAP (Lightweight Directory Access Protocol) server 404. IoT gateway 402 is an event processor EP1 and SIEM server 403 is another event processor EP2. Network printer 401 is an event source (ES1) corresponding to event processor EP1 (IoT gateway 402); LDAP server 404 is another event source (ES2) corresponding to event processor EP2 (STEM server 403). It is an objective of system 400 to detect illegal/unauthorized update of the firmware of network printer 401 and its exploitation for intrusion to LDAP server 404. The SIEM Rule for the detection is as follows: for each access from network printer 401 to LDAP server 404, if the firmware of network printer 401 has ever been updated, then offence is raised because the firmware may have been illegally updated.

As shown in FIG. 3, at step 301, the STEM (Security Information and Event Management) rules are converted to formal representations. For example, for a given SIEM rule, when network printer 401 emits an LDAP lookup event and when printer emitted a firmware update event in the past, then an offence is raised. Thus, the SIEM rule (semi-formal) is as follows:

ldap(t,printer, . . . )→offence when
∃t'<t.fw(t',printer, . . . )∈past_event

Note that the "when . . . " part of this rule can be regarded as a "critical condition", that is, if this condition holds when a LDAP event occurs, the system will no longer stay in the normal state but turn into the abnormal (or "error") state.

More specifically, this can be rephrased as: (1) If a "fw" (firmware) event has occurred in the past (P) and the latest event is "ldap" (Q), then the system no longer stays in the normal state. (2) If this is not the case, the system stays in the normal state. Based on this, the normal state can be defined as:

$$\neg(P \wedge Q) \equiv \neg P \vee \neg Q \equiv \neg P \vee (P \wedge \neg Q)$$

Figure 5:
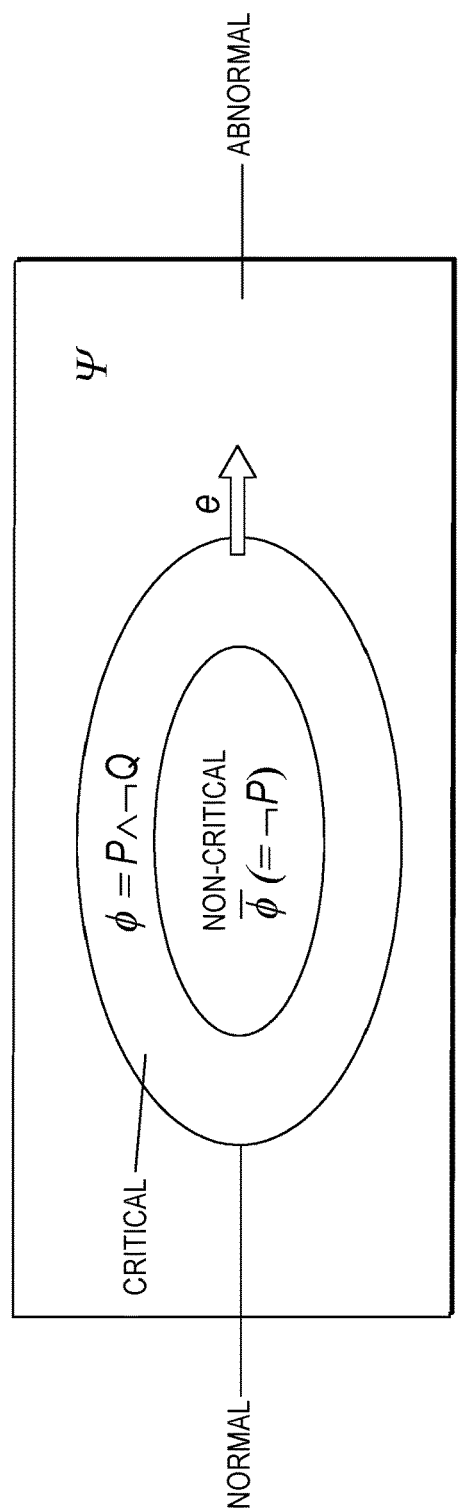
FIG. 5 is a diagram showing formal rules $\phi$ and $\bar{\phi}$, in accordance with one embodiment of the present invention.

The normal state is further divided into two following cases. (1) Non-Critical $\bar{\phi}$: No "fw" (firmware) event has ever occurred (¬P). It is defined that $\bar{\phi}$=¬P. (2) Critical φ: one or more "fw" (firmware) event have occurred (P) although the latest event is not "ldap" (¬Q). It is defined that φ=P∧¬Q. Thus, the normal state can be equivalently defined as $\phi \vee \bar{\phi}$. The abnormal state (ψ) is defined as $\psi = \neg(\phi \vee \bar{\phi})$. The above description is illustrated in FIG. 5. States are divided into three categories: a normal and noncritical state, a normal but critical state, and an abnormal state. For a normal and noncritical state, it is unlikely that the state changes to an abnormal state; for a normal but critical state, the state is about to change to an abnormal state; for an abnormal state, an alert should be raised.

Temporal logic is a well-known formalism for specifying relations between timed events. So, it seems natural to employ it to define rules formally. However, it turns out to be not that easy because of the following reasons. (1) Temporal logic is basically for defining and analyzing open-ended systems, that is, temporal formulas are supposed to hold at every moment of time (including future), whereas security rules focus on relations the past events and the current event. (2) Normality and abnormality are not distinguished in temporal logic. Thus, it is very difficult to capture "criticality" in temporal logic.

Figure 6:
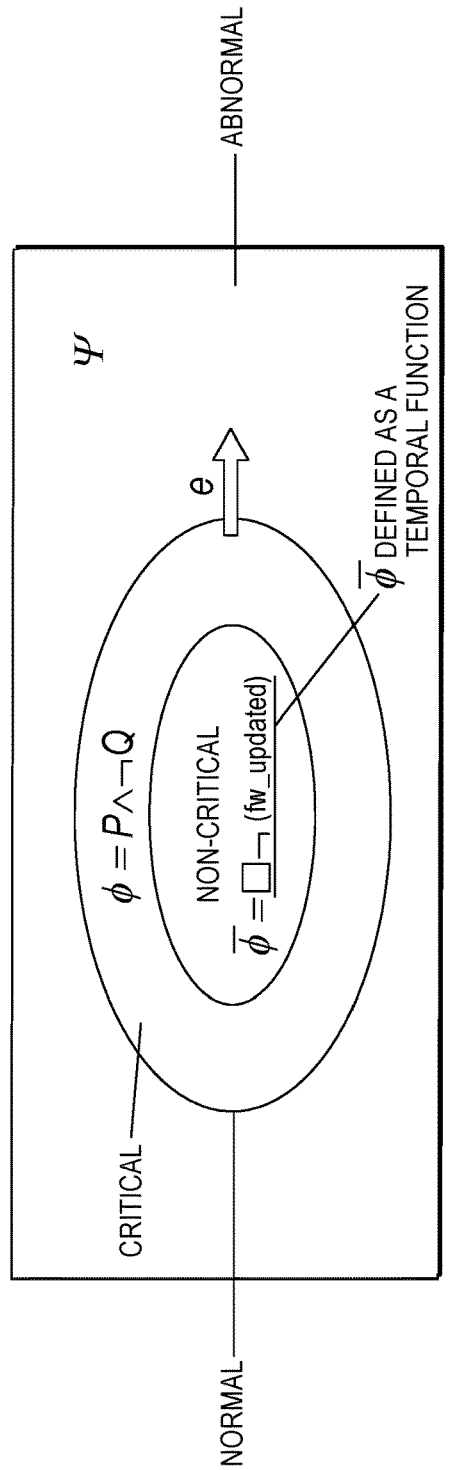
FIG. 6 is a diagram showing formal rules $\phi$ and $\bar{\phi}$ with temporal logic, in accordance with one embodiment of the present invention.

Among φ, $\bar{\phi}$, and e, $\bar{\phi}$ (non-critical condition) can be regarded as an open-ended property for staying non-critical. Thus, it is convenient to define $\bar{\phi}$ as a temporal formula. FIG. 6 is a diagram showing formal rules φ and $\bar{\phi}$ with temporal logic. In FIG. 6, □ is called temporal "always" operator. □¬(fw_updated) means that "up until now, the system has never been in the 'fw_updated' state".

Given a sequence of the past events $es_P$ and the latest event e, the predicates φ and $\bar{\phi}$ are defined as follows:

$$\phi(es_P, e) = \begin{cases} \phi(es_P), & e \neq ldap \\ \overline{\phi}(es_P), & e = fw \end{cases}$$

$$\overline{\phi}(es_P, e) = \overline{\phi}(es_P), \quad e \neq fw$$

As shown in FIG. 3, at step 302, the rule abstraction of formal rules is generated by using an abstraction function. Let us consider that each of $\phi$ and $\overline{\phi}$ represents the event sequences for which it holds. $\phi$ is regarded to represents $\{es|\phi(es)\}$. The abstraction aims to eliminate distinction between $\phi(es_P)$ and $\overline{\phi}(es_P)$, etc, that is the abstraction makes it possible to regard both $\phi(es_P)$ and $\overline{\phi}(es_P)$ as $$\phi^\alpha = \{es^\alpha | \phi^\alpha(es^\alpha)\}.$$

Based on this, the following system of recursive equations is derived.

$$\phi^\alpha = \phi^\alpha \cdot e(e \neq ldap)$$

$$\phi^\alpha = \phi^\alpha \cdot fw$$

$$\overline{\phi}^\alpha = \overline{\phi}^\alpha \cdot e(e \neq fw)$$

where "." in the above equations denotes the concatenation operator. By solving the above equations (i.e., maximal fixed point solution), $\phi^\alpha$ and $\overline{\phi}^\alpha$ are obtained.

Figure 7:
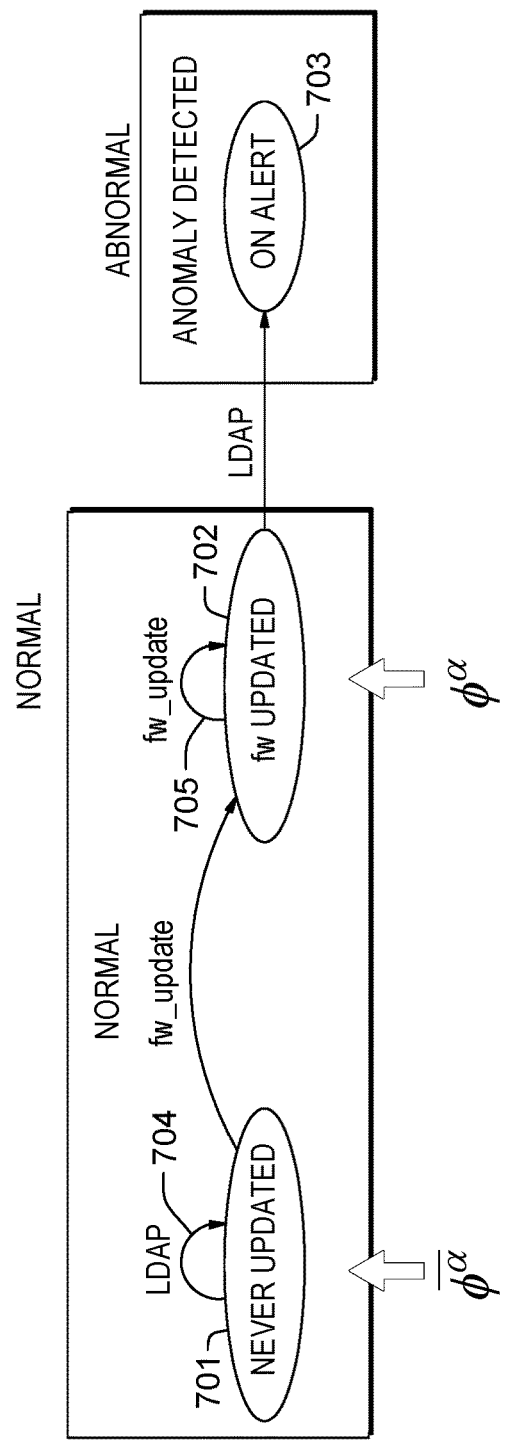
FIG. 7 is a diagram showing the semantics of the finite state machine in the first use case shown in FIG. 4, in accordance with one embodiment of the present invention.

As shown in FIG. 3, the finite automaton is constructed at step 303 and the irrelevant transitions are eliminated at step 304. FIG. 7 is a diagram showing the semantics of the finite state machine in the first use case shown in FIG. 4, in accordance with one embodiment of the present invention. The initial state is "never updated" (701). When "fw_update" is raised, if the state is "never updated" (701), the finite state machine changes its state from "never updated" (701) to "fw update" (702). When "fw_update" is raised, if the state is "fw update" (702), the finite state machine just remains in "fw update" (702).

Referring to FIG. 7, when "ldap" is raised, if the state is "never updated" (701), the finite state machine just remains "never updated" (701). When "ldap" is raised, if the state is "fw update" (702), the finite state machine changes its state from "fw update" (702) to "on alert" (703) and raises a security alert.

Referring to FIG. 7, note that events denoted by numerals 704 and 705 can be eliminated because events 704 and 705 does not trigger state transitions. Thus, the optimized finite automaton is generated.

Figure 8:
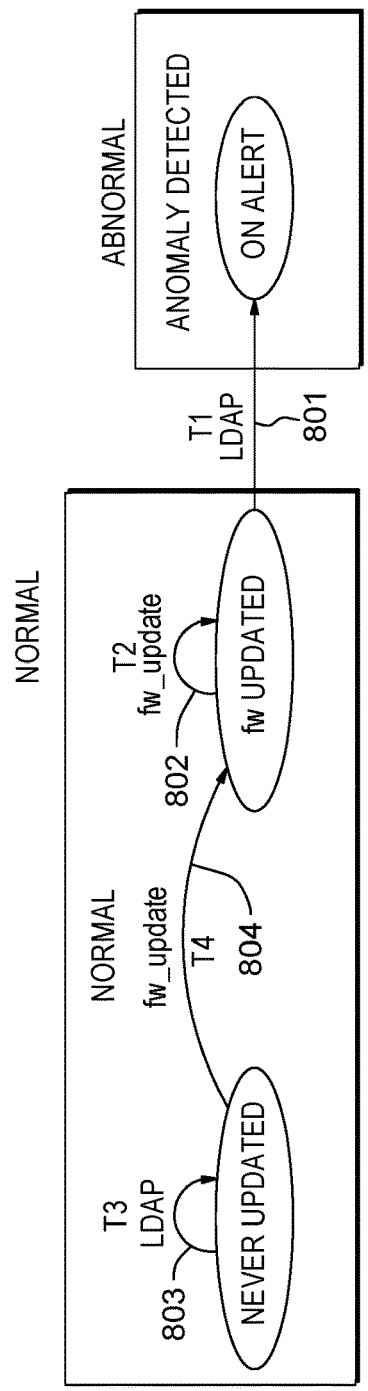
FIG. 8 is a diagram showing optimized formal rules for state transitions in FIG. 7 in a first use case, in accordance with one embodiment of the present invention.

As shown in FIG. 3, at step 305, optimized formal rules are generated. Based on the derived state transitions shown in FIG. 7, a set of new rules are as follows. (1) Each event processor (e.g., event processor EP1 IoT gateway 402 and event processor EP2 SIEM server 403 shown in FIG. 4) carries a state indicating whether any "fw" event has ever occurred. (2) When one event processor (EP) encounters an event that leads to updating its state, the event is forwarded to the other event processors (EPs) so the states of the entire EPs are kept identical. FIG. 8 is a diagram showing optimized formal rules for state transitions in FIG. 7, in accordance with one embodiment of the present invention. For state transition T1 801 (in which the finite state machine changes its state from "fw update" to "on alert"), there are two rules: R1a and R1b. R1a: ldap→sate:="on alert" when state="fw update". R1b: raise offence, when state="on alert". For state transition T2 802 and state transition T3 803, there is no rule generation. For state transition T4 804 (in which the finite state machine changes its state from "never updated" to "fw update"), rule R4 is fw update→sate:="fw_updated", when state="never updated".

The generated optimized formal rules are distributed over in a network of event processors, such as event processor EP1 (IoT gateway 402) and event processor EP2 (SIEM server 403) in the first use case shown in FIG. 4.

Figure 9:
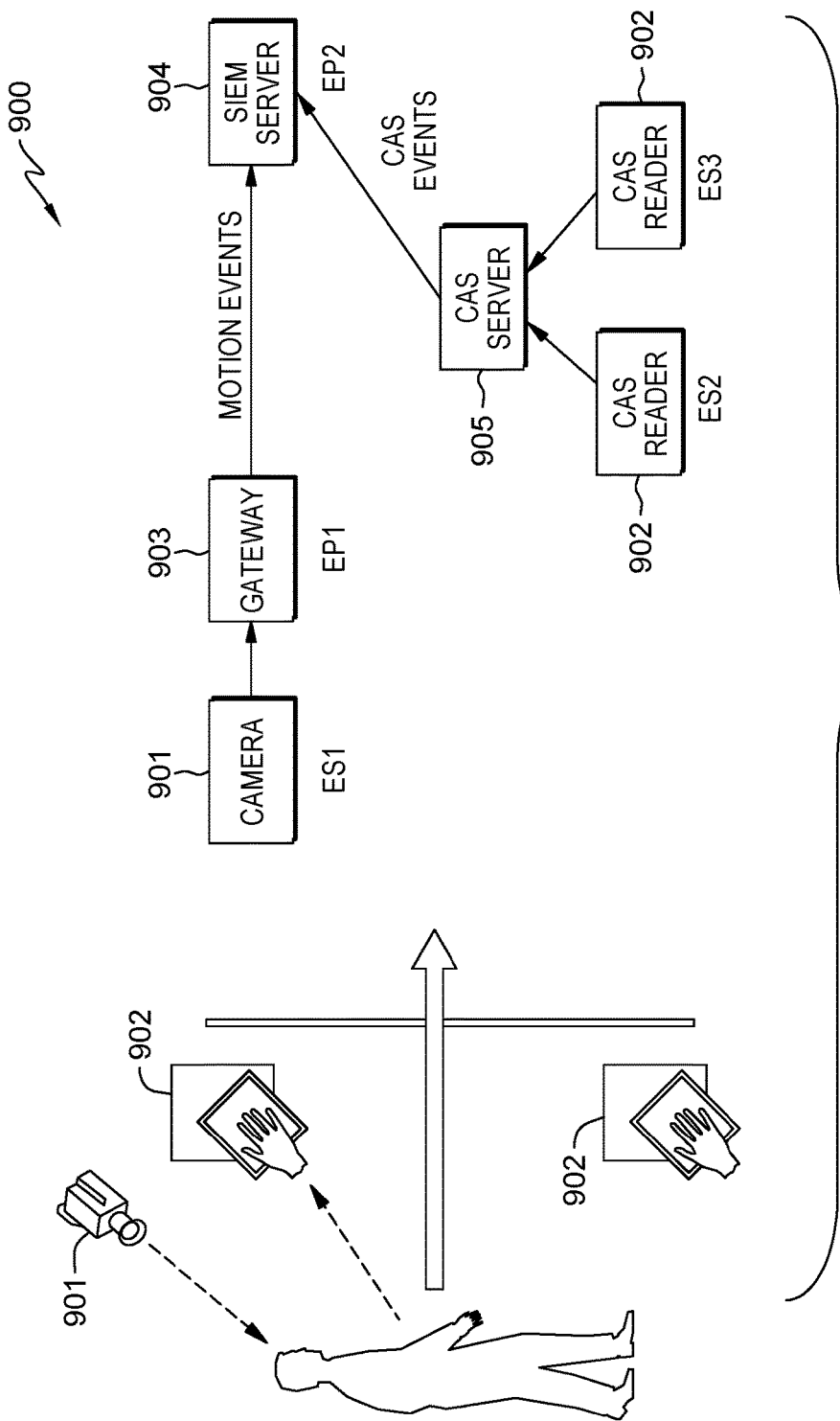
FIG. 9 is a diagram showing a system in a second use case, in accordance with one embodiment of the present invention.

FIG. 9 is a diagram showing system 900 in a second use case, in accordance with one embodiment of the present invention. The objective of system 900 is to detect possible dysfunction of surveillance camera (integrated with motion detector) 901. System 900 further comprises IC card reader or computer-based controlled access system (CAS) reader 902. As shown in FIG. 9, surveillance camera 901 is event source ES1 and IC card reader or CAS readers 902 are event sources ES2 and ES3. Surveillance camera 901 is an event source of gateway 903 which is event processor EP1. IC card reader or CAS readers 902 are connected to CAS server 905. System 900 further comprises SIEM (Security Information and Event Management) server 904. As shown in FIG. 9, SIEM server 904 receives motion events from gateway 903 and CAS events from CAS server 905.

The SIEM rule is as follows: For each entry event (or CAS event), if no motion detection has occurred within the last 1 minute, then an offence is raised due to potential anomaly of surveillance camera 901. The SIEM rule (semi-formal) is described as:

$$cas(t) \rightarrow \text{offence when } \forall t' \in [t-1 \text{ min},t] \cdot \text{moton}(V)$$
$$\in \text{past\_events}$$

Note that the "when . . . " part of the above rule can be regarded as a critical condition, that is, if this condition holds when a CAS event occurs, the system will no longer stay in a normal state but turn into an abnormal (or error) state. More specifically, this can be rephrased as follows: If no motion event has occurred within the last 1 minute (P) and a latest event is "lcas" (Q), then the system no longer stays in the normal state; If this is not the case, the system stays in the normal state. Based on this, the normal state can be defined as:

$$\neg(P \land Q) \equiv \neg P \lor \neg Q \equiv \neg P \lor (P \land \neg Q)$$

The normal state is further divided into two following cases. (1) Non-Critical: One or more motion events have occurred in the last minutes ($\neg P$). (2) Critical: no motion event has occurred in the last minutes (P), though the latest event is not a CAS event ($\neg Q$). Let $\phi = P \land \neg Q$ and $\overline{\phi}_\chi = \neg P$, the normal state can be equivalently defined as $\phi \lor \overline{\phi}_\chi$ and the abnormal state is defined as $\psi = \neg(\phi \land \overline{\phi}_\chi)$. $\chi$ is called a "clock" variable, which denotes how much time has passed since the last motion event. It is assumed that special "pass ($\Delta t$)" events are raised periodically so the system can always be aware of the current time.

Given a sequence of the past events $es_P$ and the latest event e, the predicates $\phi$, $\overline{\phi}$ and $\psi$ are characterized by the following properties:

Non-critical: One or more motion events have occurred within last 1 minute ($\neg P$).

$$\overline{\phi}_\chi(es_P), \chi \leq 1 \text{ min}, e=\text{motion} \Rightarrow \overline{\phi}_0(es_P, e) \qquad \text{a.}$$

$$\overline{\phi}_\chi(es_P), \chi \leq 1 \text{ min}, e \neq \text{motion}, e \neq \text{pass}(\Delta t) \Rightarrow \overline{\phi}_\chi(es_P, e) \qquad \text{b.}$$

$$\overline{\phi}_\chi(es_P), \chi \leq 1 \text{ min}, e=\text{pass}(\Delta t), \chi + \Delta t \leq 1 \text{ min} \Rightarrow$$
$$\overline{\phi}_{\chi + \Delta t}(es_P, e) \qquad \text{c.}$$

$$\overline{\phi}_\chi(es_P), \chi \leq 1 \text{ min}, e=\text{pass}(\Delta t), \chi + \Delta t > 1 \text{ min} \Rightarrow \neg$$
$$\overline{\phi}_{\chi + \Delta t}(es_P, e) \qquad \text{d.}$$

Critical: No motion event has occurred in the last 1 minute (P), and the latest event≠cas (¬Q).

a. $\phi(es_P), e \neq \text{motion} \wedge e \neq cas \Rightarrow \phi(es_P, e)$ b. $\phi(es_P), e = \text{motion} \Rightarrow \neg \phi(es_P, e)$ For the case that the system have been so far staying in the normal state:

$$\phi(es_P) \vee \overline{\phi}_\chi(es_P)$$

For the case that the transition is changed from the normal state to the abnormal state:

$$\phi(es_P) \vee \overline{\phi}_\chi(es_P) \Rightarrow \psi_\chi(es_P, e) \equiv \phi(es_P) \wedge e = cas$$

In the same way as the first use case, $\phi$ and $\overline{\phi}$ are defined as follows:

$$\phi(es_P, e) = \begin{cases} \overline{\phi}_\chi(es_P), & (e = \text{pass }(\Delta t) \wedge \chi + \Delta t > 1 \text{ min}) \\ \phi(es_P), & (e \neq \text{motion}) \end{cases}$$

$$\overline{\phi}_0(es_P, e) = \begin{cases} \phi(es_P), & (e = \text{motion}) \\ \overline{\phi}_\chi(es_P), & (e = \text{motion}) \end{cases}$$

$$\overline{\phi}_{\chi+\Delta t}(es_P, e) = \overline{\phi}_\chi(es_P), (e = \text{pass }(\Delta t) \wedge \chi + \Delta t \leq 1 \text{ min})$$

$$\overline{\phi}_\chi(es_P, e) = \overline{\phi}_\chi(es_P), (e \neq \text{pass }(\Delta t) \wedge e \neq \text{motion})$$

Figure 10:
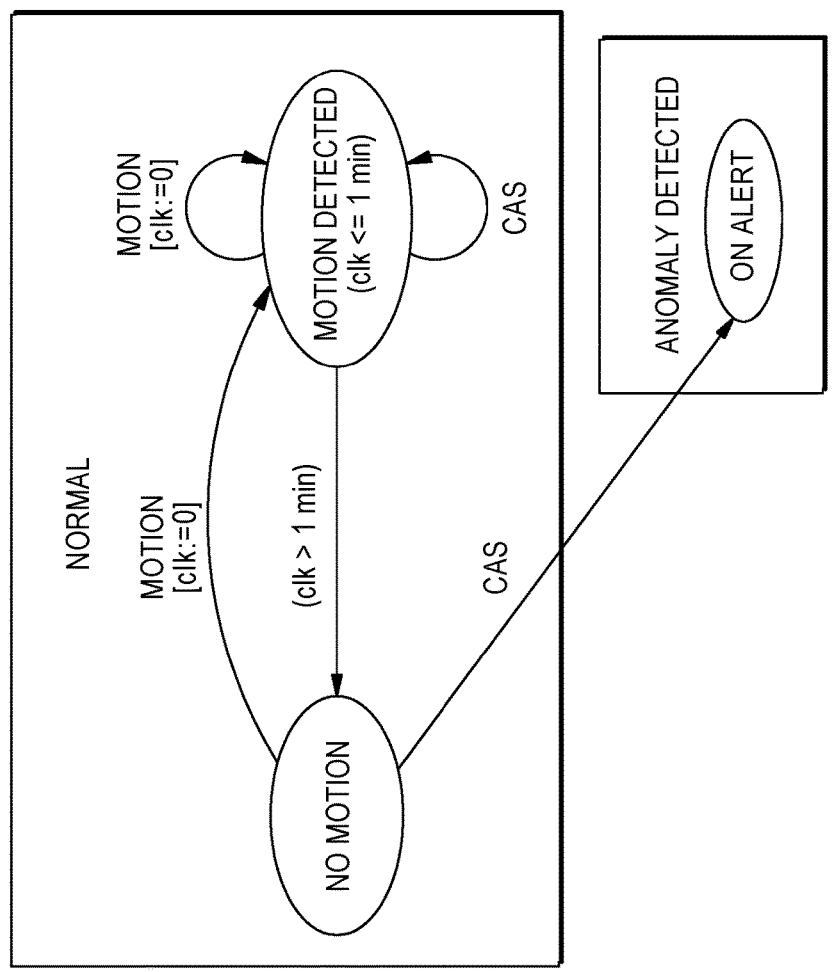
FIG. 10 is a diagram showing a timed automaton in the second use case shown in FIG. 9, in accordance with one embodiment of the present invention.

FIG. 10 is a diagram showing a timed automaton in the second use case, in accordance with one embodiment of the present invention. FIG. 10 presents a state-machine form of the rules defined above. The timed automaton carries one or more clock variables. In the figure, "clk" is a clock variable. Each clock variable can be reset to 0, i.e., clk:=0. After resetting to 0, the value of the clock variable increases as the time passes; pass(Δt) in the formulas above enforces this. Each state can accompany an invariant condition that refers to the clock variable, e.g., clk≤1 min. As soon as the invariant condition for a state no longer holds, a state transition is invoked for leaving the state. Each state transition can accompany a clock reset action (clk:=0) and/or a guard condition, e.g., clk>1 min.

Figure 11:
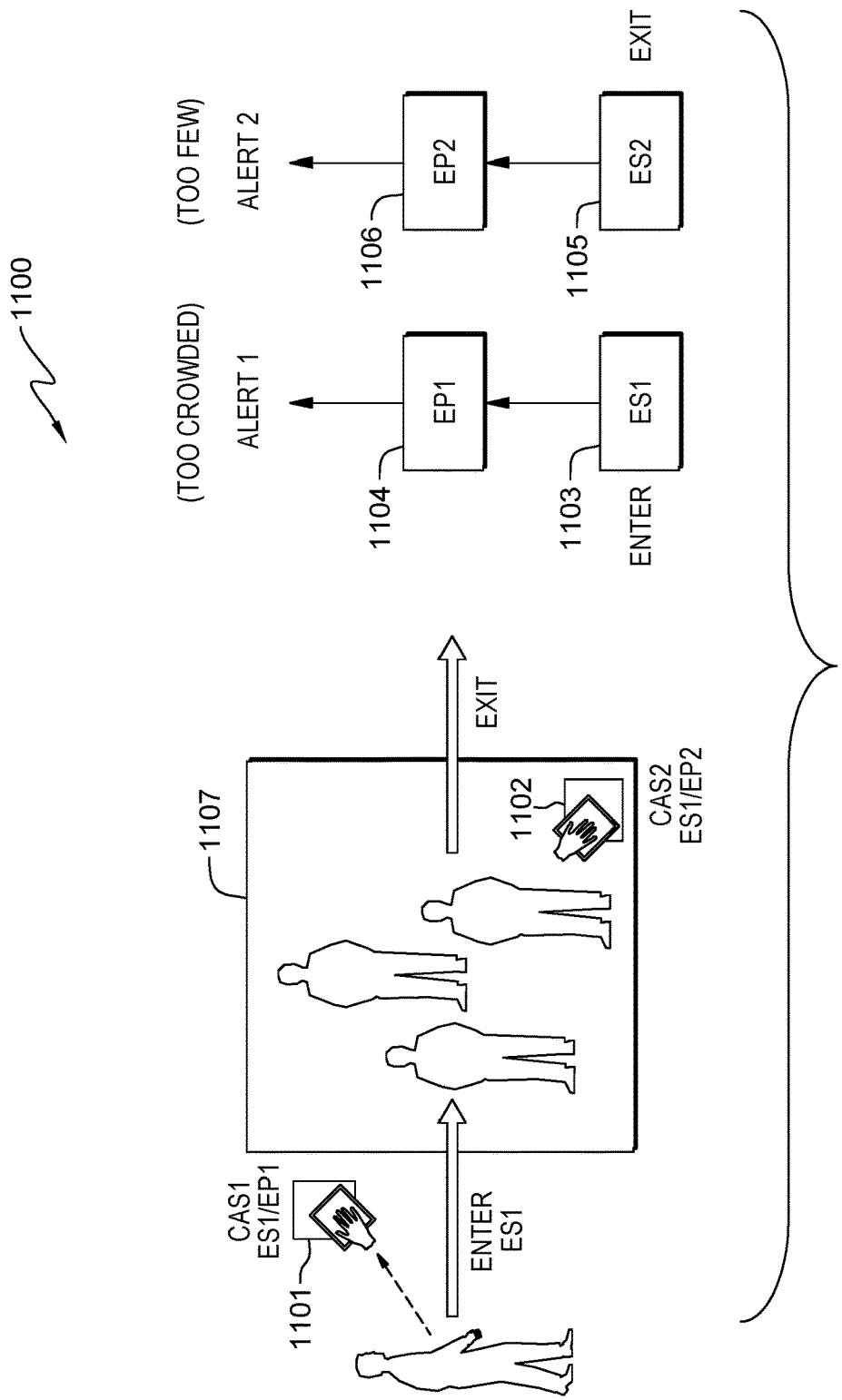
FIG. 11 is a diagram showing a system in a third use case, in accordance with one embodiment of the present invention.

FIG. 11 is a diagram showing system 1100 in a third use case, in accordance with one embodiment of the present invention. System 1100 is for enforcing that a suitable number human personnel are always stationed in room 1107 of a building by monitoring entries and exits using IC card readers or computer-based controlled access system (CAS) reader. For example, IC card reader or CAS readers include CAS1 1101 and CAS2 1102. CAS1 1101 functions as an event source (ES1) for entry and an event processor (EP1); CAS1 1102 functions as an event source (ES2) for exit and an event processor (EP2). The objective of system 1100 is to raise alerts when the number of people in the room becomes too crowded or too few.

SIEM (Security Information and Event Management) rules are as follows. When event processor EP1 1104 receives an entry event from event source ES1 1103, if the number of people in room 1107 is greater than 2N/3, EP1 104 raises an alert (alert1: too crowded). When event processor EP2 1106 receives an exit event from event source ES2 105, if the number of people in room 1107 is less than N/3, EP2 106 raises an alert (alert2: too few). N is the maximum number of people that room 1107 can hold. The SIEM rules (semi-formal) are described as:

enter→alert1 when $n > 2N/3$ exit→alert2 when $n < N/3$ where n=|{enter∈past_events}|−|exit∈past_events|.

Note that the "when . . . " part of the above rule can be regarded as a critical condition, that is, if this condition holds when an event occurs, the system will no longer stay in a normal state but turn into an abnormal (or error) state. More specifically, the above rules can be rephrased as follows: If $n>2N/3$ (P1) and the latest event is "enter" (Q1), then the system no longer stays in the normal state (alert1). If $n<N/3$ (P2) and the latest event is "exit" (Q2), the system no longer stays in the normal state (alert2). If $n \geq N/3$ and $n \leq 2N/3$, then the system stays in the normal state. Note that the conditions that involve "n" are post-conditions are supposed to hold after events are raised. Thus, the system is in the normal state if and only both $\neg(P_1 \wedge Q_1)$ and $\neg(P_2 \wedge Q_2)$ hold. Let $\phi_1 = P_1 \wedge \neg Q_1$, $\overline{\phi}_1 = \neg P_1$, $\phi_2 = P_2 \wedge \neg Q_2$, and $\overline{\phi}_2 = \neg P_2$ The predicates $\overline{\phi}_1, \phi_2, \overline{\phi}_1, \overline{\phi}_2, \psi_1$, and $\psi_2$ are characterized by the following properties:

Non-critical 1: $n \leq 2N/3$ ($\neg P_1$).

a. $\overline{\phi}_1(es_P), e = \text{any} \Rightarrow \overline{\phi}_1(es_P, e) \left(n \leq \frac{2N}{3}\right)$ b. $\overline{\phi}_1(es_P), e = \text{any} \Rightarrow \neg \overline{\phi}_1(es_P, e) \left(n > \frac{2N}{3}\right)$ Critical 1: $n>2N/3$ ($P_1$) and the latest event is not "enter" ($\neg P_1$).

a. $\phi_1(es_P), e \neq \text{enter} \Rightarrow \phi_1(es_P, e) \left(n > \frac{2N}{3}\right)$ b. $\phi_1(es_P), e \neq \text{enter} \Rightarrow \neg \phi_1(es_P, e) \left(n \leq \frac{2N}{3}\right)$ Abnormal 1:

$\psi_1(es_P, e) \equiv \phi_1(es_P) \wedge e = \text{enter}$

Non-critical 2: $n \geq N/3$ ($\neg P_2$).

a. $\overline{\phi}_2(es_P), e = \text{any} \Rightarrow \overline{\phi}_2(es_P, e) \left(n \geq \frac{N}{3}\right)$ b. $\overline{\phi}_2(es_P), e = \text{any} \Rightarrow \neg \overline{\phi}_2(es_P, e) \left(n < \frac{N}{3}\right)$ Critical 2: $n<N/3$ ($P_2$) and the latest event is not "exit" ($\neg P_2$).

a. $\phi_2(es_P), e \neq \text{exit} \Rightarrow \phi_2(es_P, e) \left(n < \frac{N}{3}\right)$ b. $\phi_2(es_P), e \neq \text{exit} \Rightarrow \neg \phi_2(es_P, e) \left(n \geq \frac{N}{3}\right)$ Abnormal 2:

$\psi_2(es_P, e) \equiv \phi_2(es_P) \wedge e = \text{exit}$

In the same way as the first use case and the second use case, $\overline{\phi}_1, \phi_2, \overline{\phi}_1$, and $\overline{\phi}_2$ are defined as follows:

$$\bar{\phi}_1(es_P, e) = \begin{cases} \bar{\phi}_1(es_P), & \left(n \le \frac{2N}{3}\right) \\ \phi_1(es_P), & \left(e \ne \text{enter}, n \le \frac{2N}{3}\right) \end{cases}$$

$$\phi_1(es_P, e) = \begin{cases} \bar{\phi}_1(es_P), & \left(e = \text{enter}, n > \frac{2N}{3}\right) \\ \phi_1(es_P), & \left(e \ne \text{enter}, n > \frac{2N}{3}\right) \end{cases}$$

$$\bar{\phi}_2(es_P, e) = \begin{cases} \bar{\phi}_2(es_P), & \left(n \ge \frac{N}{3}\right) \\ \phi_2(es_P), & \left(e \ne \text{exit}, n \ge \frac{N}{3}\right) \end{cases}$$

$$\phi_2(es_P, e) = \begin{cases} \bar{\phi}_2(es_P), & \left(e = \text{exit}, n < \frac{N}{3}\right) \\ \phi_1(es_P), & \left(e \ne \text{exit}, n < \frac{N}{3}\right) \end{cases}$$

Figure 12:
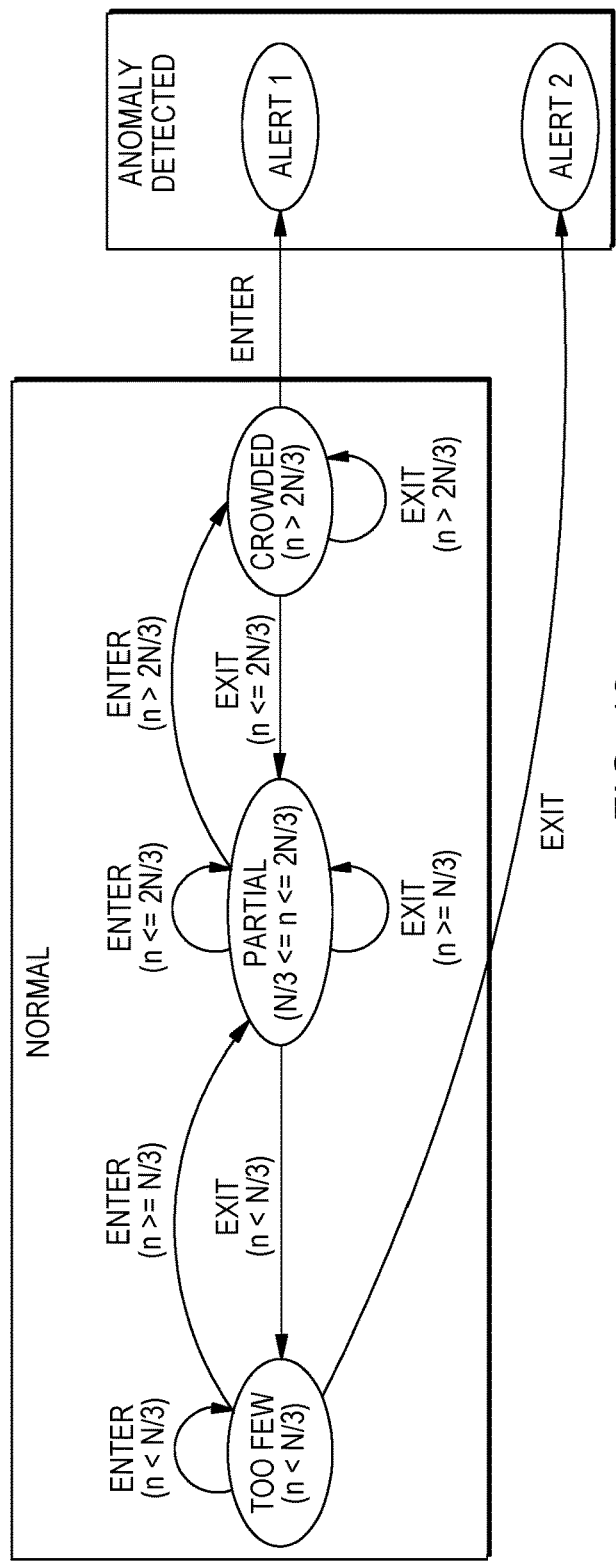
FIG. 12 is a diagram showing a finite automaton in the third use case shown in FIG. 11, in accordance with one embodiment of the present invention.

FIG. 12 is a diagram showing a finite automaton in the third use case, in accordance with one embodiment of the present invention. FIG. 12 presents a state-machine form of the rules defined above. $\phi_i$ and $\bar{\phi}_i$ naturally derives state transition systems $M_i$ (i=1, 2). Let $M=M_1 \cap M_2$ represents the entire system. M is in a normal state if and only if both $M_1$ and $M_2$ are in a normal state. M is in an abnormal state if and only if either $M_1$ or $M_2$ are in an abnormal state. Each of event processors carries a copy of $M=M_1 \cap M_2$ and keeps tracking of a current state. When the current state is critical, an enter event immediately leads to invoking altert1, or an exit event immediately lead to invoking altert2. Each state transition at an event process is forwarded to the other event processor (EPs) so that the entire EPs always point to a same state. Events that lead to state transitions are forwarded to the entire EPs. n is re-computed at each event processor. Events that do not invoke state transitions are processed locally where they are received.

FIG. 13 is a diagram illustrating components of computer device 1300 for automatic transformation of security event detection rules and deploying the rules in a network of event processors or components of computer device 1300 hosting one or more event processors and/or Security Information and Event Management (SIEM) rules, in accordance with one embodiment of the present invention. It should be appreciated that FIG. 13 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 13, computer device 1300 includes processor(s) 1320, memory 1310, and tangible storage device(s) 1330. In FIG. 13, communications among the above-mentioned components of computer device 1300 are denoted by numeral 1390. Memory 1310 includes ROM(s) (Read Only Memory) 1311, RAM(s) (Random Access Memory) 1313, and cache(s) 1315. One or more operating systems 1331 and one or more computer programs 1333 reside on one or more computer readable tangible storage device(s) 1330. On a computer system or a server for automatic transformation of security event detection rules and deploying the rules in a network of event processors, one or more computer programs 1333 include one or more computer programs for automatic transformation of security event detection rules and deploying the rules in a network of event processors. Computer device 1300 further includes I/O interface(s) 1350. I/O interface(s) 1350 allows for input and output of data with external device(s) 1360 that may be connected to computer device 1300. Computer device 1300 further includes network interface(s) 1340 for communications between computer device 1300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for transformation of security information and event management (SIEM) rules and deploying the SIEM rules in a network of event processors, the method comprising:
    converting the SIEM rules to formal representations;
    generating rule abstraction of the formal representations, by using an abstraction function;
    constructing a finite automaton based on the rule abstraction;
    eliminating irrelevant transitions in the finite automaton to generate an optimized finite automaton;
    generating optimized formal rules, based on the optimized finite automaton;
    converting the optimized formal rules to optimized SIEM rules; and
    deploying the optimized SIEM rules in the network of the event processors.

2. The computer-implemented method of claim 1, wherein the optimized formal rules are defined for all of the event processors in the network, by assuming a single event processor without considering distribution of the event processors.

3. The computer-implemented method of claim 1, wherein the event processors share a state of a finite state machine, an event incurs a state transition of the finite state machine.

4. The computer-implemented method of claim 3, wherein, when the state transition changes the state of the finite state machine, the event is passed to one or more remote event processors in the network.

5. The computer-implemented method of claim 3, wherein, when the state transition does not change the state of the finite state machine, the event is consumed by a local event processor and is not passed to one or more remote event processors in the network.

6. The computer-implemented method of claim 3, wherein the state of the finite state machine is one of three categories: a normal and non-critical state, a normal but critical state, and an abnormal state, wherein the state does not change to the abnormal state if the state is the normal and non-critical state, wherein the state changes to the abnormal state if the state is the normal but critical state, wherein an alert is raised if the state is the abnormal state.

7. A computer program product for transformation of security information and event management (SIEM) rules and deploying the SIEM rules in a network of event processors, the computer program product comprising a non-transitory computer readable storage medium having program code embodied therewith, the program code executable to:
    convert the SIEM rules to formal representations;
    generate rule abstraction of the formal representations, by using an abstraction function;
    construct a finite automaton based on the rule abstraction;
    eliminate irrelevant transitions in the finite automaton to generate an optimized finite automaton;
    generate optimized formal rules, based on the optimized finite automaton;
    convert the optimized formal rules to optimized SIEM rules; and
    deploy the optimized SIEM rules in the network of the event processors.

8. The computer program product of claim 7, wherein the optimized formal rules are defined for all of the event processors in the network, by assuming a single event processor without considering distribution of the event processors.

9. The computer program product of claim 7, wherein the event processors share a state of a finite state machine, an event incurs a state transition of the finite state machine.

10. The computer program product of claim 9, wherein, when the state transition changes the state of the finite state machine, the event is passed to one or more remote event processors in the network.

11. The computer program product of claim 9, wherein, when the state transition does not change the state of the finite state machine, the event is consumed by a local event processor and is not passed to one or more remote event processors in the network.

12. The computer program product of claim 9, wherein the state of the finite state machine is one of three categories: a normal and non-critical state, a normal but critical state, and an abnormal state, wherein the state does not change to the abnormal state if the state is the normal and non-critical state, wherein the state changes to the abnormal state if the state is the normal but critical state, wherein an alert is raised if the state is the abnormal state.

13. A computer system for transformation of security information and event management (STEM) rules and deploying the STEM rules in a network of event processors, the computer system comprising:
one or more processors, one or more computer readable tangible storage devices, and program instructions stored on at least one of the one or more computer readable tangible storage devices for execution by at least one of the one or more processors, the program instructions executable to:
convert the SIEM rules to formal representations;
generate rule abstraction of the formal representations, by using an abstraction function;
construct a finite automaton based on the rule abstraction;
eliminate irrelevant transitions in the finite automaton to generate an optimized finite automaton;
generate optimized formal rules, based on the optimized finite automaton;
convert the optimized formal rules to optimized SIEM rules; and
deploy the optimized SIEM rules in the network of the event processors.

14. The computer system of claim 13, wherein the optimized formal rules are defined for all of the event processors in the network, by assuming a single event processor without considering distribution of the event processors.

15. The computer system of claim 13, wherein the event processors share a state of a finite state machine, an event incurs a state transition of the finite state machine.

16. The computer system of claim 15, wherein, when the state transition changes the state of the finite state machine, the event is passed to one or more remote event processors in the network.

17. The computer system of claim 15, wherein, when the state transition does not change the state of the finite state machine, the event is consumed by a local event processor and is not passed to one or more remote event processors in the network.

18. The computer system of claim 15, wherein the state of the finite state machine is one of three categories: a normal and non-critical state, a normal but critical state, and an abnormal state, wherein the state does not change to the abnormal state if the state is the normal and non-critical state, wherein the state changes to the abnormal state if the state is the normal but critical state, wherein an alert is raised if the state is the abnormal state.

* * * * *